(12) United States Patent
Price (10) Patent No.: US 7,507,019 B2
(45) Date of Patent: Mar. 24, 2009

(54) THERMOMETER CALIBRATION

(75) Inventor: Jeffrey E. Price, Wildwood, MO (US)

(73) Assignee: Covidien AG (CH)

( * ) Notice: Subject to any disclaimer, the term of this patent is extended or adjusted under 35 U.S.C. 154(b) by 51 days.

(21) Appl. No.: 11/419,360

(22) Filed: May 19, 2006

(65) Prior Publication Data

US 2007/0268953 A1   Nov. 22, 2007

(51) Int. Cl.
*G01K 15/00* (2006.01)
*G01J 5/00* (2006.01)

(52) U.S. Cl. .................. 374/1; 374/2; 374/E13.003; 374/121

(58) Field of Classification Search ........... 374/1–3, 374/141–157, 161, 163, 166, 164, 181–182; 324/130, 74, 601; 600/549, 379; 250/252.1; 702/99
See application file for complete search history.

(56) References Cited

U.S. PATENT DOCUMENTS

| | | | |
|---|---|---|---|
| 2,227,938 A | | 1/1941 | Krebs |
| 3,216,236 A | | 11/1965 | Rohrbach |
| 3,245,248 A | | 4/1966 | Ritter |
| 3,631,708 A | | 1/1972 | Ensor |
| 3,702,076 A | | 11/1972 | Georgi |
| 3,822,598 A | | 7/1974 | Brothers et al. |
| 3,872,726 A | | 3/1975 | Kauffeld et al. |
| 3,877,307 A | | 4/1975 | Georgi |
| 3,921,453 A | * | 11/1975 | Platzer, Jr. .......... 374/181 |
| 3,942,123 A | | 3/1976 | Georgi |
| 3,978,325 A | | 8/1976 | Goldstein et al. |
| 4,022,063 A | | 5/1977 | West et al. |
| 4,050,289 A | * | 9/1977 | Fairbairn et al. ........ 374/3 |
| 4,068,526 A | | 1/1978 | Goldstein |
| 4,075,882 A | | 2/1978 | Waldron |
| 4,092,863 A | | 6/1978 | Turner |
| 4,133,700 A | * | 1/1979 | Hollander et al. ........ 374/181 |
| 4,161,880 A | | 7/1979 | Prosky |
| 4,183,248 A | | 1/1980 | West |
| 4,206,649 A | | 6/1980 | Nagaie |
| 4,341,117 A | | 7/1982 | Goldstein |

(Continued)

FOREIGN PATENT DOCUMENTS

CN   1304032   7/2001

(Continued)

OTHER PUBLICATIONS

Hart Scientific Model 9135 (1999) http://web.archive.org/web/19990922025859/http://www.hartscientific.com/products/9135.htm.*

(Continued)

*Primary Examiner*—Patrick J Assouad
*Assistant Examiner*—Bret Adams
(74) *Attorney, Agent, or Firm*—Edward S. Jarmolowicz, Esq.

(57) ABSTRACT

A method for calibrating a thermometer is disclosed. The thermometer comprises a primary temperature sensor for determining the temperature of a target. The thermometer also comprises a reference temperature sensor positioned proximate to the primary temperature sensor and being responsive to an extraneous temperature affecting the primary temperature sensor. One calibration method calibrates the reference temperature sensor. This calibration can utilize a non-electrically conductive liquid bath for temperature control. Another calibration method calibrates the reference temperature sensor and the primary temperature sensor.

16 Claims, 4 Drawing Sheets

U.S. PATENT DOCUMENTS

| | | | |
|---|---|---|---|
| 4,497,585 A | | 2/1985 | Paull et al. |
| 4,523,859 A | | 6/1985 | Bonnier et al. |
| 4,541,734 A | | 9/1985 | Ishizaka |
| 4,559,954 A | | 12/1985 | Murase |
| 4,565,456 A | | 1/1986 | Iida et al. |
| 4,574,359 A | | 3/1986 | Ishizaka et al. |
| 4,592,000 A | | 5/1986 | Ishizaka et al. |
| 4,602,642 A | * | 7/1986 | O'Hara et al. ............... 600/474 |
| 4,602,871 A | | 7/1986 | Hanaoka |
| 4,627,740 A | | 12/1986 | Jerde et al. |
| 4,629,336 A | | 12/1986 | Ishizaka |
| 4,648,055 A | | 3/1987 | Ishizaka et al. |
| 4,658,407 A | | 4/1987 | Iwama |
| 4,673,300 A | | 6/1987 | Wilhelmson et al. |
| 4,691,713 A | | 9/1987 | Suzuki |
| 4,727,500 A | | 2/1988 | Jackson et al. |
| 4,784,149 A | | 11/1988 | Berman et al. |
| 4,790,324 A | | 12/1988 | O'Hara et al. |
| 4,797,840 A | * | 1/1989 | Fraden ....................... 702/104 |
| 4,811,198 A | | 3/1989 | Ota et al. |
| 4,819,249 A | | 4/1989 | Ekstrom et al. |
| 4,832,504 A | | 5/1989 | Hori et al. |
| 4,843,577 A | | 6/1989 | Muramoto |
| 4,846,583 A | | 7/1989 | Yamamoto |
| 4,866,621 A | | 9/1989 | Ono |
| 4,877,333 A | | 10/1989 | Ota et al. |
| 4,878,184 A | | 10/1989 | Okada et al. |
| 4,885,463 A | | 12/1989 | Wellman et al. |
| 4,900,162 A | * | 2/1990 | Beckman et al. ............ 374/132 |
| 4,901,257 A | | 2/1990 | Chang et al. |
| 4,932,789 A | | 6/1990 | Egawa et al. |
| 4,993,419 A | | 2/1991 | Pompei et al. |
| 5,011,294 A | | 4/1991 | Yamaguchi |
| 5,015,102 A | | 5/1991 | Yamaguchi |
| 5,066,141 A | | 11/1991 | Ikeda et al. |
| 5,144,814 A | | 9/1992 | Gaudette |
| 5,150,969 A | | 9/1992 | Goldberg et al. |
| 5,169,235 A | | 12/1992 | Tominaga et al. |
| 5,183,337 A | | 2/1993 | Pompei |
| 5,195,827 A | | 3/1993 | Audy et al. |
| 5,229,612 A | | 7/1993 | Pompei et al. |
| 5,246,293 A | * | 9/1993 | Luotsinen et al. ........... 374/181 |
| 5,259,389 A | | 11/1993 | Muramoto et al. |
| 5,265,958 A | | 11/1993 | Ludlow |
| 5,293,877 A | * | 3/1994 | O'Hara et al. ............... 600/549 |
| 5,333,784 A | | 8/1994 | Pompei |
| 5,388,134 A | | 2/1995 | Douglass et al. |
| 5,392,031 A | | 2/1995 | Toriumi et al. |
| 5,473,629 A | | 12/1995 | Muramoto |
| 5,513,235 A | | 4/1996 | Douglass et al. |
| 5,608,838 A | | 3/1997 | Brookley |
| 5,614,716 A | | 3/1997 | Rupert et al. |
| 5,632,555 A | | 5/1997 | Gregory et al. |
| 5,678,923 A | | 10/1997 | Germanow et al. |
| 5,725,308 A | | 3/1998 | Smith et al. |
| 5,738,441 A | | 4/1998 | Cambridge et al. |
| 5,767,792 A | | 6/1998 | Urbas et al. |
| 5,795,063 A | | 8/1998 | Christiaens et al. |
| 5,801,968 A | | 9/1998 | Wu et al. |
| 5,874,736 A | | 2/1999 | Pompei |
| 5,887,978 A | * | 3/1999 | Lunghofer et al. .......... 374/179 |
| 5,899,570 A | | 5/1999 | Darmawaskita et al. |
| 5,967,992 A | | 10/1999 | Canfield |
| 6,000,846 A | | 12/1999 | Gregory et al. |
| 6,002,953 A | | 12/1999 | Block |
| 6,033,109 A | * | 3/2000 | Huang ....................... 374/183 |
| 6,036,361 A | | 3/2000 | Gregory et al. |
| 6,056,435 A | | 5/2000 | Pompei |
| 6,059,452 A | | 5/2000 | Smith et al. |
| 6,065,866 A | | 5/2000 | Kraus et al. |
| 6,139,180 A | | 10/2000 | Usher et al. |
| 6,149,298 A | | 11/2000 | Kraus et al. |
| 6,155,712 A | | 12/2000 | Egawa |
| 6,170,983 B1 | | 1/2001 | Germanow et al. |
| 6,179,785 B1 | | 1/2001 | Martinosky et al. |
| 6,193,411 B1 | | 2/2001 | Chen |
| 6,232,614 B1 | | 5/2001 | Christy et al. |
| 6,238,628 B1 | | 5/2001 | Matsutani |
| 6,270,252 B1 | | 8/2001 | Siefert |
| 6,283,629 B1 | * | 9/2001 | Kraus et al. ..................... 374/2 |
| 6,371,925 B1 | | 4/2002 | Imai et al. |
| 6,435,711 B1 | | 8/2002 | Gerlitz |
| 6,447,160 B1 | | 9/2002 | Fraden |
| 6,609,824 B1 | | 8/2003 | Sato et al. |
| 6,629,776 B2 | * | 10/2003 | Bell et al. .................... 374/170 |
| 6,631,287 B2 | | 10/2003 | Newman et al. |
| 6,641,299 B2 | | 11/2003 | Sasajima et al. |
| 6,663,277 B1 | | 12/2003 | Sandmæl |
| 6,698,921 B2 | | 3/2004 | Siefert |
| 6,709,152 B1 | | 3/2004 | Bronlund |
| 6,742,925 B2 | | 6/2004 | Maccarone |
| 6,789,936 B1 | | 9/2004 | Kraus et al. |
| 6,839,651 B2 | | 1/2005 | Lantz et al. |
| 6,854,883 B2 | | 2/2005 | Rund et al. |
| 6,865,407 B2 | | 3/2005 | Kimball et al. |
| 6,908,224 B2 | | 6/2005 | Schneider et al. |
| 6,939,035 B2 | | 9/2005 | Machin |
| 6,971,790 B2 | | 12/2005 | Quinn et al. |
| 7,052,178 B2 | | 5/2006 | Urbas et al. |
| 7,275,866 B2 | | 10/2007 | Tseng |
| 7,297,938 B2 | | 11/2007 | Fauci et al. |
| 7,318,004 B2 | | 1/2008 | Butterfield |
| 7,347,621 B2 | | 3/2008 | Sri-Jayantha et al. |
| 7,374,336 B2 | | 5/2008 | Fraden |
| 2002/0128791 A1 | | 9/2002 | Chen et al. |
| 2002/0163955 A1 | | 11/2002 | Yu |
| 2002/0191670 A1 | | 12/2002 | Huang et al. |
| 2004/0047392 A1 | | 3/2004 | Wu et al. |
| 2004/0057494 A1 | * | 3/2004 | Tsao et al. ................... 374/121 |
| 2004/0225207 A1 | | 11/2004 | Bae et al. |
| 2005/0094705 A1 | | 5/2005 | Chi |
| 2005/0249263 A1 | | 11/2005 | Yerlikaya et al. |
| 2005/0271115 A1 | | 12/2005 | Takeuchi |
| 2006/0039446 A1 | | 2/2006 | Lee |
| 2006/0047467 A1 | | 3/2006 | Bedard et al. |
| 2006/0062274 A1 | | 3/2006 | Pompei |
| 2006/0072645 A1 | | 4/2006 | Quinn et al. |
| 2007/0116089 A1 | | 5/2007 | Bisch et al. |
| 2007/0160112 A1 | | 7/2007 | Nanda |
| 2007/0189358 A1 | | 8/2007 | Lane et al. |

FOREIGN PATENT DOCUMENTS

| | | |
|---|---|---|
| CN | 1308225 | 8/2001 |
| DE | 2064292 | 7/1972 |
| DE | 29907098 U1 | 7/1999 |
| DE | 29819056 U1 | 8/1999 |
| DE | 20018955 | 3/2001 |
| EP | 0432262 B1 | 6/1991 |
| EP | 0446788 B1 | 9/1991 |
| EP | 0562039 B2 | 9/1993 |
| EP | 0593414 A2 | 4/1994 |
| EP | 0593415 A2 | 4/1994 |
| EP | 0763349 B1 | 3/1997 |
| EP | 0777114 A2 | 6/1997 |
| EP | 1190668 A1 | 3/2002 |
| JP | 59018425 | 1/1984 |
| JP | 63191934 | 8/1988 |
| JP | 8114512 | 5/1996 |
| JP | 200370750 A | 3/2003 |
| WO | 9806324 A1 | 2/1998 |
| WO | 0040939 A1 | 7/2000 |
| WO | 02103306 A2 | 12/2002 |
| WO | 2003087885 A2 | 10/2003 |

| WO | 2004055488 A1 | 7/2004 |
| WO | 2005040743 A1 | 5/2005 |

OTHER PUBLICATIONS

Isothermal Technology Ltd., Infrared Calibration: Blackbody Fixed Point Cells, Nov. 2, 2005, 2 pages, http://www.isotech.co.uk/bbody/tympanic.html.

Perkinelmer, Thermoelectric Infrared Sensors (Thermopiles) for Remote Temperature Measurements; Pyrometry, Jul. 11, 2000, pp. 1-12.

Thermoscan, INC. Inc., Infrared Temperature Reference, Operator's Manual: Model IR-3000, 1992, 6 sheets, San Diego, California, U.S.

Isothermal Technology Ltd., Infrared Tympanic Thermometer Validation System, at least as early as Nov. 2005, 2 pages.

Tyco Healthcare, FirstTemp Genius, Mar. 2004, 2 pages, Gosport, Hampshire, UK.

Tyco Healthcare, Temperature Monitoring, Jan. 2000, 12 pages, Gosport, Hampshire, UK.

Greenes, David S., "Accuracy of Noninvasive Temporal Artery Thermometer for Use in Infants," Arch Pediatr Adolesc Med. 2001; 155: 376-381.

Solvay Solexis, Inc., Galden DET, Material Safety Data Sheet, 2004, 4 pp.

Solvay Solexis, Inc., Galden PFPE: Reliability Testing Fluids, Product Data Sheet, Nov. 3, 2005, 4 pp.

Jan. 7, 2008 Office Action and references cited by Examiner in related U.S Appl. No. 11/419,336, 7 pages.

Dexter Research Center, Inc: "ST60 TO-5" [Online] XP002449050, URL:http://web.archive.org/web/20060215204354/www.dexter-research.com/products/st60-to5.html, pp. 1-2 (2006).

Dexter Research Center, Inc: "Thermistor Options" [Online] XP002449051, URL:http://web.archive.org/web/20060127085339/www.dexterresearch.com/products/downloads/thermistors.pdf (2006).

ILX Lightwave: "Thermistor calibration and the Steinhart-Hart Equation" Application Note #4, Sep. 2003, XP002449052, pp. 2-4.

* cited by examiner

THERMOMETER CALIBRATION

FIELD OF THE INVENTION

The present invention generally relates to a calibration system for calibrating electronic thermometers. More specifically, the present invention relates to calibrating a reference temperature sensor (e.g., a temperature-dependent resistor) and a primary temperature sensor (i.e., a thermopile) within a tympanic thermometer.

BACKGROUND

The diagnosis and treatment of many body ailments depends upon an accurate reading of the internal or core temperature of a patient's body temperature reading, and in some instances, upon comparison to a previous body temperature. For many years, the most common way of taking a patient's temperature involved utilization of Mercury thermometers. However, such thermometers are susceptible to breaking and must be inserted and maintained in the rectum or mouth for several minutes, often causing discomfort to the patient.

Because of the drawbacks of conventional Mercury thermometers, electronic thermometers were developed and are now in widespread use. Although electronic thermometers provide relatively more accurate temperature readings than Mercury thermometers, they nevertheless share many of the same drawbacks. For example, even though electronic thermometers provide faster readings, some time must still pass before an accurate reading can be taken. Moreover, electronic thermometers must still be inserted into the patient's mouth, rectum or axilla.

Tympanic thermometers, those thermometers that sense the infrared emissions from the tympanic membrane, provide nearly instantaneous readings of core temperature without the undue delay of other thermometers. The tympanic thermometer is generally considered by the medical community to be superior to oral, rectal, or axillary sites for taking a patient's temperature. This is because the tympanic membrane is more representative of the body's internal or core temperature and more responsive to changes in core temperature.

Conventional tympanic thermometers typically include two sensors. One sensor is a primary temperature sensor for measuring the temperature of the tympanic membrane. In one conventional tympanic thermometer, the primary temperature sensor is an infrared sensor, such as a thermopile. The thermopile is adapted to measure the emitted radiation of the tympanic membrane to determine the temperature of the membrane, without contacting the membrane. The other sensor is a reference temperature sensor for measuring the temperature of the primary temperature sensor, or thermopile. In one conventional tympanic thermometer, the reference temperature sensor is temperature-dependent resistor, such as a thermistor or a polysilicon resistor, mounted on the cold junction of the thermopile. Because the response of the thermopile is dependent upon the temperature of the thermopile itself, the ambient temperature of the resistor may be utilized to estimate the temperature of the thermopile to compensate for the thermopile's temperature dependency.

Typically, tympanic thermometers require calibration at the factory during manufacturing in order achieve the quick and accurate temperature reading capability noted above. Calibration of the tympanic thermometer at the factory requires individual calibration of each thermometer unit so that the proper calibration parameters of each individual thermometer can be written to the memory (e.g., EEPROM) of each thermometer's microprocessor. These calibration parameters involve determining the proper values for variables representing the sensors within each thermometer and any parameters related to the optical system, such as the geometry of the primary temperature sensor with respect to the ear canal and the device housing. Once these calibration parameters are determined and written to the memory of each thermometer, calibration is complete and the unit is shipped for sale. Unfortunately, known techniques for calibrating the tympanic thermometer fail to account for differences (e.g., manufacturing differences) in reference temperature sensors and assume that each of the reference temperature sensors responds in the same manner to a given input. Other known techniques may also rely upon the calibration of the primary temperature sensor to provide sufficiently accurate data to extract parameters of the reference temperature sensor. Aspects of the present invention involve a calibration process whereby both the reference temperature sensor and the primary temperature sensor are calibrated.

In addition, conventional methods for calibration often utilize a temperature-controlled water bath to control the temperature of the thermometer, or its components, during calibration. Because water is a conductor of electricity, the thermometer or its components are typically placed into a bag before immersion in the water bath. The bag acts as a barrier to block the water from contacting the thermometer or thermometer components while immersed in the bath. Utilizing such a bag creates various issues, including additional bag loading and bag unloading steps, potential bag leaks, condensation within the bag, an air gap between the bag and the thermometer or thermometer components, and increased calibration time due to temperature control of the bag and air gap. Aspects of the embodiments of the present invention invoke a process whereby the user of such bags is avoided.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, a method for calibrating a reference temperature sensor of a thermometer is disclosed. A method for calibrating a reference temperature sensor of a thermometer and a primary temperature sensor based upon the calibration of the reference temperature sensor is also disclosed. By providing a non-electrically conductive liquid for calibration, aspects of the embodiments of the invention can streamline the calibration process.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
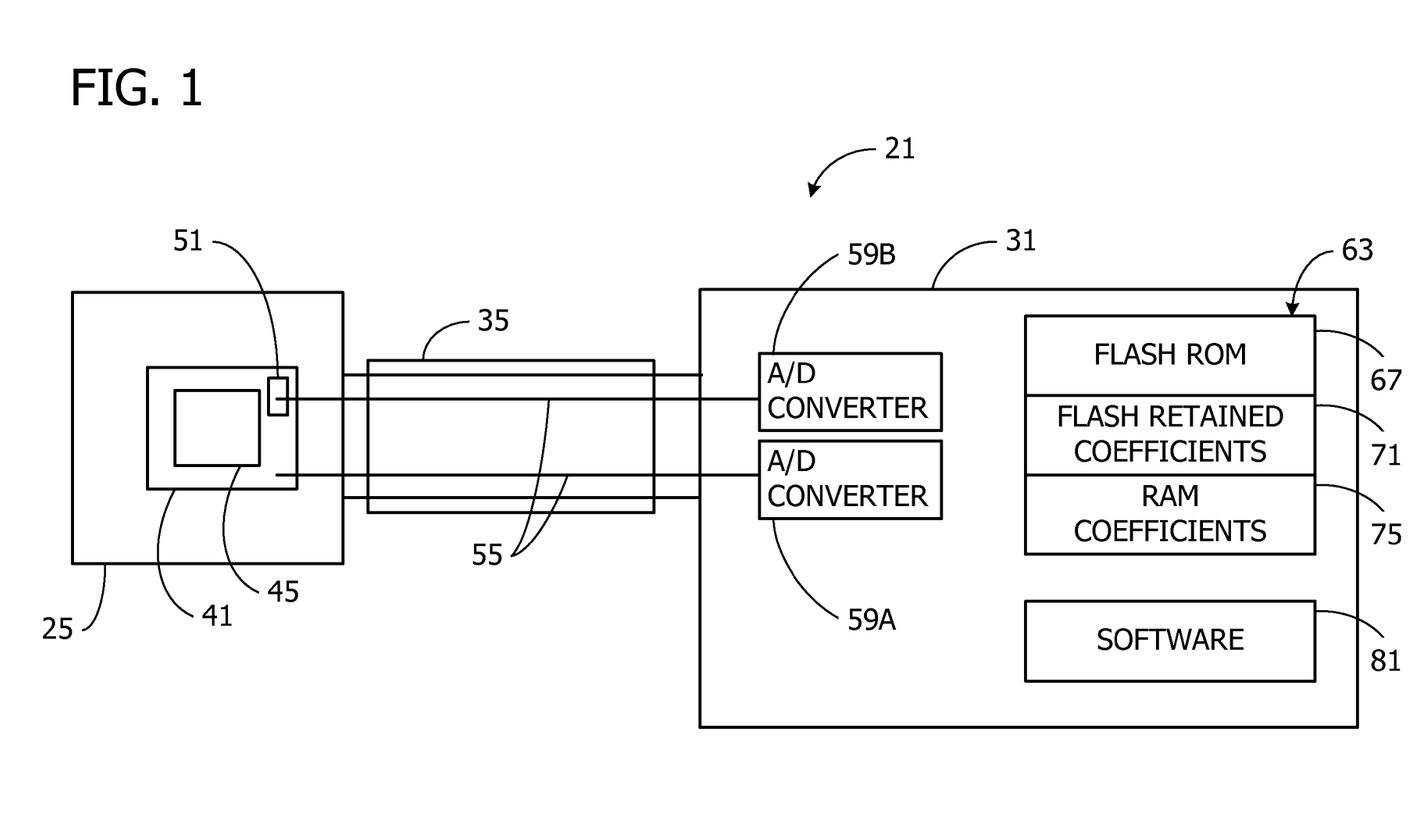
FIG. 1 is simplified block diagram of the components of a thermometer of the present invention.

FIG. 1 illustrates the components of a typical radiation thermometer, such as a tympanic thermometer, or generally, an electronic temperature device. The thermometer, generally indicated 21, comprises a sensor unit 25, or sensor can, for determining a temperature of a target. In the embodiment shown, the sensor unit 25 communicates with a central processing unit 31 (CPU) via a flexible cable 35. The CPU 31 and sensor unit 25 may alternately communicate via other communication links, such as by a wireless communication link, utilizing various signal formats, such as analog or digital.

The sensor unit 25 comprises a primary temperature sensor 41 for measuring the temperature of the target (i.e., target temperature). In one example, the primary temperature sensor 41 comprises a thermopile 45. The thermopile may be utilized to determine the temperature of a target tympanic membrane (i.e., ear drum), for example, to determine the body temperature of an animal, such as a human being. For example, see commonly owned, co-pending U.S. patent application Ser. No. 10/480,428, filed Dec. 10, 2003, entitled "THERMAL TYMPANIC THERMOMETER TIP," and published on Dec. 2, 2004 as US 2004-0240516 A1, which is hereby incorporated by reference in its entirety. Targets other than the tympanic membrane are also contemplated as within the scope of the claimed invention. Temperature sensing devices other than thermopiles 45 are also contemplated as within the scope of the present invention. For example, the primary temperature sensor 41 may be a device that converts radiant energy to some other measurable form. This can be an electrical current or a change in some physical property of the detector. For example, bolometers, pyroelectric sensors (PIRs), and photo-multiplier tubes (PMTs), among others, are contemplated as within the scope of the present invention.

The thermometer 21 additionally comprises a reference temperature sensor 51. In one example, the reference temperature sensor 51 is positioned proximate to the primary temperature sensor 41 and is responsive to an extraneous temperature affecting the primary temperature sensor. Many types of temperature sensors are contemplated as within the scope of the present invention. For example, the reference temperature sensor 51 may be a temperature-dependent resistor, such as a polysilicon resistor, a negative temperature coefficient (NTC) resistor, or a positive temperature coefficient (PTC) resistor. In one example, the temperature-dependent resistor 51 is a polysilicon resistor, such as the Dexter ST60 polysilicon resistor, available from Dexter Research Center, Inc. of Dexter, Mich. The temperature-dependent resistor 51 may be embedded on the primary temperature sensor 41, or thermopile (such as inside or outside the sensor can 25 of the thermopile), so that the temperature of the temperature-dependent resistor closely follows the temperature of the cold junctions of the thermopile.

In the embodiment shown in FIG. 1, both the primary temperature sensor 41 and the reference temperature sensor 51 communicate with the CPU 31 via respective wire leads 55. The primary temperature sensor 41 communicates via one channel with an Analog/Digital converter 59A for measuring a differential output voltage of the primary temperature sensor. The temperature-dependent resistor 51 communicates via a single channel with a single Analog/Digital converter 59B for measuring, or reading, the output resistance of the temperature-dependent resistor. As would be readily understood by one skilled in the art, and which will not be described in more detail here, the Analog/Digital converters 59 convert the signals of the respective primary temperature sensor 41 and temperature-dependent resistor 51 to digital form for further processing by the CPU 31. Other signal conditioning devices and/or software may also be included with the thermometer 21, such as gain conditioning, band-pass filtering, and buffering, among others, as would be understood by one skilled in the art.

The CPU 31 further comprises a memory component, generally indicated 63, for storing data, such as the calibration coefficients discussed in detail below. In the example shown, the memory component is divided into three portions: a Flash Read-Only Memory (ROM) component 67 for storing code, a Flash retained coefficients component 71 for storing coefficients, and a Random-Access Memory (RAM) coefficients component 75 utilized as a working memory. Other memory components may be added without departing from the scope of the present invention. The CPU 31 further comprises a software component 81 for storing instructions for the operation of the thermometer 21 by the CPU 31. In one example, this software component 81 is stored in the ROM component 67.

Methods

Figure 2:
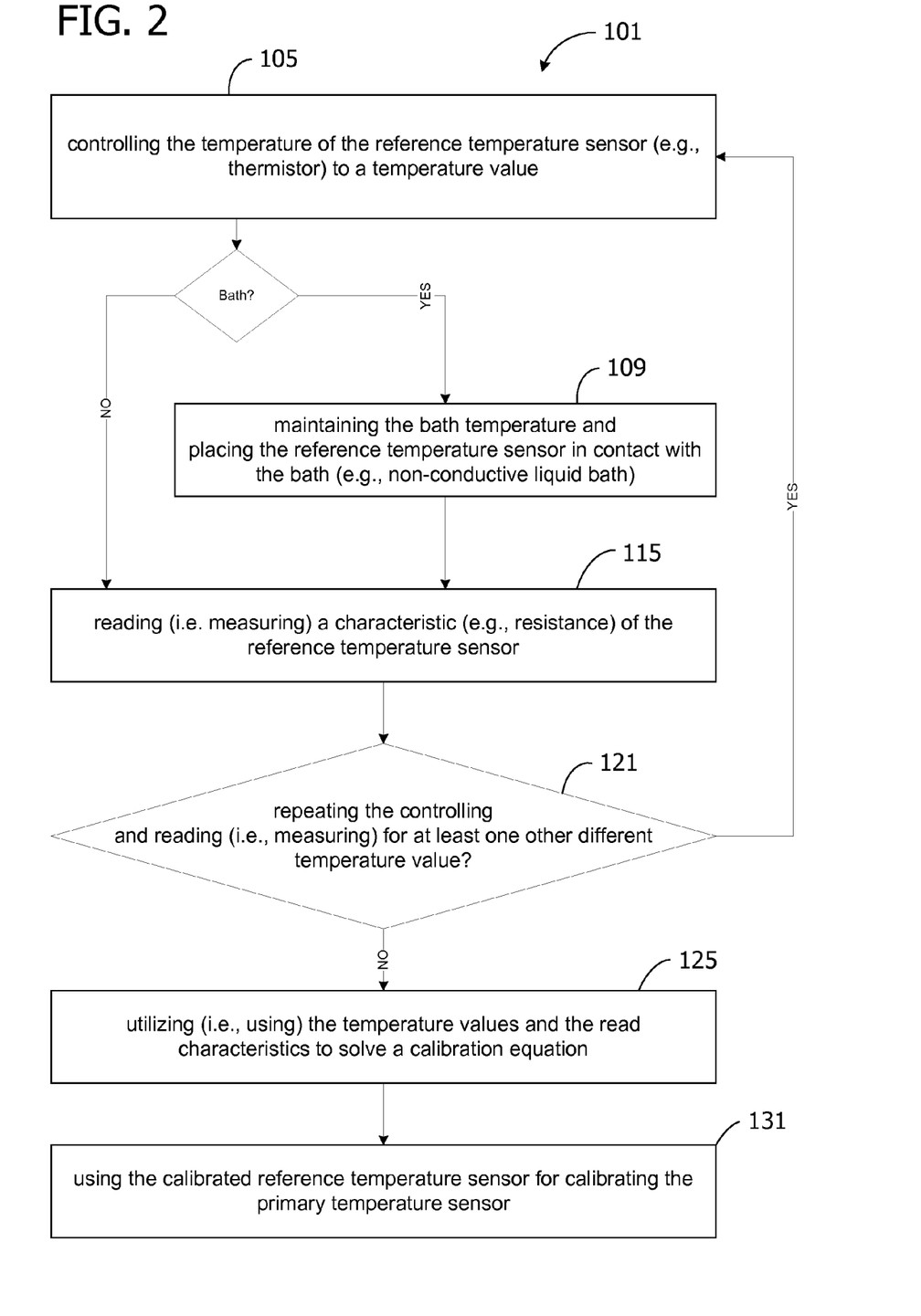
FIG. 2 is a flow diagram of a method of one embodiment of the present invention.

Referring now to FIG. 2, a method for calibrating a thermometer 21 is generally indicated at 101. Calibration of such thermometers 21 is important to ensure accurate temperature readings. Such calibrations may take place during initial manufacturing of the thermometer 21 or as part of a recalibration process, such as after some thermometer use. In one example, the required accuracy of the thermometer 21 is ±0.1 degrees C. (±0.2 degrees F.), such that the accuracy of the calibration process may be enhanced to a tighter tolerance (e.g., ±0.01 degrees C. (±0.02 degrees F.)), as other measurement and process uncertainties will add to this error. By calibrating the thermometer 21 to a tighter tolerance, such measurement and process uncertainties should not cause the thermometer to operate beyond its desired accuracy, thereby enhancing the accuracy of the thermometer. Other tolerances may be utilized without departing from the scope of embodiments of the invention.

The method 101 for calibrating the reference temperature sensor 51 comprises multiple operations. In particular, the method 101 comprises controlling, at 105, the temperature of the reference temperature sensor 51 (e.g., a temperature-dependent resistor) to a first temperature value. In one example, the controlling 105 the temperature comprises immersing, or placing, the reference temperature sensor 51 in a temperature-controlled liquid bath. In another example, which is the subject of the following discussion, the controlling 105 the temperature comprises immersing the thermometer 21, or at least a portion thereof, in the temperature-controlled liquid bath. The thermometer 21, and therefore the reference temperature sensor 51, can be protected from exposure to the liquid in the bath by placing the reference temperature sensor in a waterproof bag before immersing the reference temperature sensor in the bath. Other means for protecting the thermometer 21, the reference temperature sensor 51, or other thermometer components, from exposure to the liquid in the bath are also contemplated as within the scope of the present invention.

Alternately, the liquid used in the bath may be a non-electrically conductive liquid, such that a protective bag forming a liquid barrier is no longer necessary. As used herein, the term "non-electrically conductive" means highly resistant to conducting electricity. A complete absence of any measurable electrical conductivity is not required. Rather, a non-electrically conductive liquid is a liquid with adequate resistance to electrical conductivity to not have adverse affects when electronic components are immersed in the liquid. Thus, with a non-electrically conductive liquid, the thermometer 21, the reference temperature sensor 51, or other thermometer components may be placed directly in the liquid, free of liquid barriers between the temperature sensor and the non-electrically conductive liquid. The non-electrically conductive liquid is permitted to make contact with an electrically conducting component of the temperature sensor, such as a printed circuit board (PCB), with no concerns about liquid conductivity affecting the PCB to which the reference temperature sensor is connected.

Figure 4:
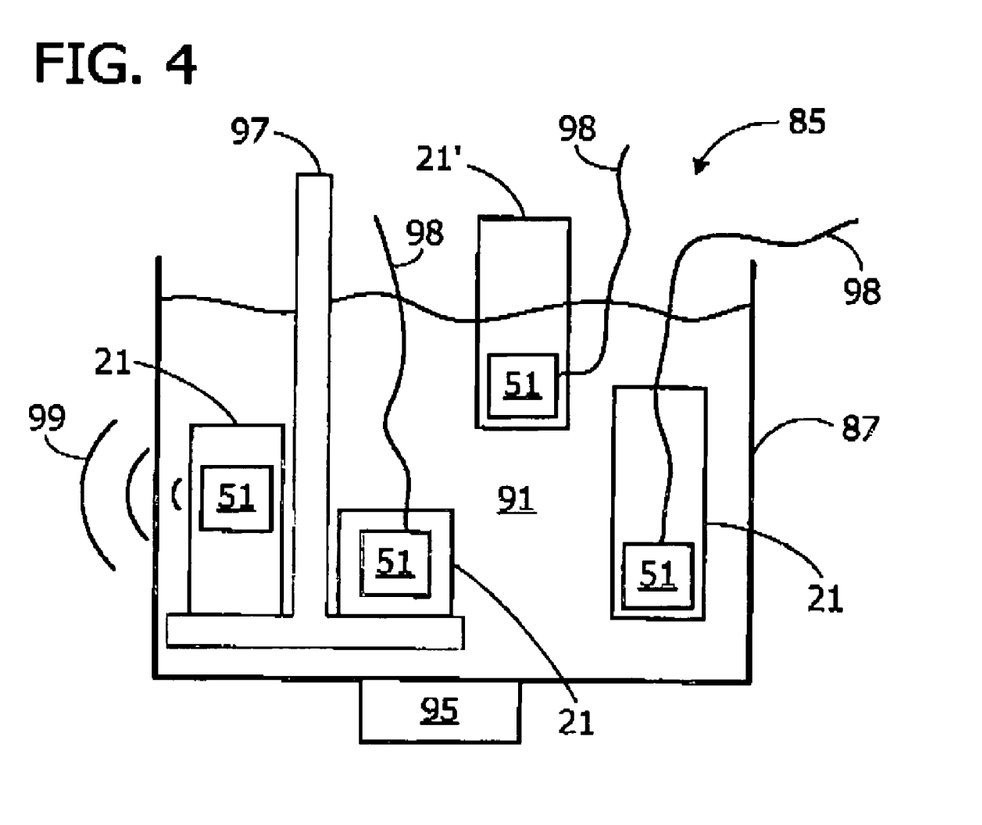
FIG. 4 is a diagram of a calibration apparatus of the present invention.

Referring briefly to FIG. 4, a calibration apparatus, generally indicated 85, adapted for utilizing a non-electrically conductive liquid for calibration according to the present method is shown. The calibration apparatus 85 comprises a container 87 adapted for receiving thermometers 21. As would be readily understood by one skilled in the art, the container 87 of the calibration apparatus 85 may be adapted for receiving other items, such as reference temperature sensors 51 by themselves or other electronic devices. The container 87 receives a non-electrically conductive liquid 91, which can be readily maintained at a set temperature by a temperature regulator 95 associated with the calibration apparatus 85. As depicted in FIG. 4, the container 87 and the non-electrically conductive liquid 91 cooperate to form a non-electrically conductive bath adapted for receiving the thermometers 21 in the non-electrically conductive liquid for maintaining the thermometers at the same temperature as the non-electrically conductive liquid. As would be readily understood by one skilled in the art, all or a portion of each thermometer 21 may be immersed in the non-electrically conductive liquid 91. In the example of FIG. 4, thermometer 21' is only partially immersed in the non-electrically conductive liquid 91, while the thermometers 21 are fully immersed in the non-electrically conductive liquid. Moreover, the container 87 may be adapted to receive two or more thermometers 21, such as the four thermometers depicted in FIG. 4. In addition, different thermometers 21 (e.g., different sizes, different models, different configurations, etc.) may utilize the same calibration apparatus 85. The apparatus 85 further comprises a fixture 97 adapted for loading and unloading two of the thermometers 21 to and from the non-electrically conductive liquid 91. The apparatus 85 can include any number and type of such fixtures for loading and unloading without departing from the scope of the embodiments of the present invention.

Utilizing a non-electrically conductive liquid 91 with the calibration apparatus 85 provides several changes in the calibration method 101, as compared with utilizing a bag for protecting the thermometers 21 from a conductive liquid, such as water. With a conductive liquid, the thermometers 21 must be placed into the bag before immersion in the bath and removed from the bag after immersion in the bath. These placing and removal steps are time consuming and are not required with the non-electrically conductive liquid, as the non-electrically conductive liquid may directly contact the thermometer 21, or other electronic device, without adverse affects. Therefore, the thermometers 21 may be directly loaded into and unloaded from the non-electrically conductive liquid 91 with the fixture 97. Moreover, such bags may leak, allowing the thermometers 21 to contact the conductive water. In addition, in a humid environment water condensation may form on the inside of the bag adjacent the thermometer 21, thereby allowing the thermometer to contact conductive water. Furthermore, during immersion in such a bag, an air gap will remain between the bag and the thermometer 21, which may adversely affect the temperature recorded and increase the time required to obtain a stable temperature for the thermometer. In addition, calibration time will be lengthened with the bag because both the bag and the air gap must be brought to the appropriate temperature, in addition to the thermometer 21. In contrast, with the non-electrically conductive liquid 91, only the temperature of the thermometer 21 itself must be controlled by the bath.

As would be readily understood by one skilled in the art, any type of non-electrically conductive liquid 91 may be utilized without departing from the scope of the embodiments of the invention. For example, a low molecular weight perfluoropolyether (PFPE) liquid may be utilized as the non-electrically conductive liquid 91. More specifically, an oxidized, polymerized, 1,1,2,3,3,3-hexafluoro propene may also be utilized as the non-electrically conductive liquid 91. Other characteristics of the non-electrically conductive liquid 91 (e.g., liquid cleanliness, opacity, translucence, corrosivity, toxicity, and viscosity, among others) may also be considered when selecting an appropriate non-electrically conductive liquid.

Returning to the method 101, the controlling 105 may control to virtually any temperature, such as 10 degrees C. (50 degrees F.), for example. In this example, the reference temperature sensor 51 of the thermometer 21 communicates with the user or apparatus calibrating the reference temperature sensor via a communication link, such as a wire lead 98, connected to the reference temperature sensor. Other types of communication links, such as a wireless communication link 99, are also contemplated as within the scope of the present invention. Moreover, the thermometer 21 need not communicate while in the bath, but may store the experimental values obtained while in the bath for use in calibrating the thermometer.

In another example applicable to both the conductive liquid and the non-electrically conductive liquid embodiments, the controlling operation 105 may comprise controlling the temperature of the bath to within a range from about ±0.005 degrees C. (±0.009 degrees F.) to about ±0.01 degrees C. (±0.018 degrees F.) of the desired bath temperature. This level of control ensures that both the bath and the thermometer 21 are maintained at a precise temperature suitable for calibration. In another example, the temperature may be further controlled by maintaining, at 109, the thermometer 21 in the temperature-controlled bath for a period of between about 15 minutes and about 30 minutes before measuring the characteristic. Extended time periods in the bath help ensure that the temperature of the thermometer 21 has sufficient time to equilibrate with the temperature of the bath.

In another example applicable to both the conductive liquid and the non-electrically conductive liquid embodiments, the method may further comprise maintaining the thermometer 21 in the temperature-controlled bath until the measured characteristic of the reference temperature sensor 51 changes less than about 0.1 percent in at least about one minute. By monitoring changes in the measured characteristic over time, the precise point at which the reference temperature sensor 51 equilibrates to the bath may be determined. Thus, any operations begun at this point in the method may be executed immediately, without unnecessary additional time in the bath beyond the point of equilibration. As would be understood by one skilled in the art, one or more of these exemplary methods for determining when the reference temperature sensor 51 is at the proper temperature may be utilized in combination without departing from the scope of the claimed invention.

The method further comprises measuring, at 115, or reading, a characteristic of the reference temperature sensor 51 at the first temperature value. In the example where the reference temperature sensor 51 is a temperature-dependent resistor, the measuring comprises measuring a resistance of the temperature-dependent resistor. These measured characteristics (e.g., resistances) may be stored in a memory (e.g., a non-volatile memory, such as those discussed above) for later use in the calibration process. In one example, the stored data may then be downloaded from the memory to a computer to solve the calibration equation(s) for the calibration coefficient(s).

After the controlling operation 105 and the measuring operation 115, the method may further comprise repeating, at 121, the controlling operation and measuring operation for at least one other temperature value different than the first temperature value. In one example, the repeating operation 121 comprises controlling 105 the temperature of the reference temperature sensor 51 to a second temperature value and measuring 115 a characteristic of the reference temperature sensor at the second temperature value. In still another example, the repeating operation 121 may further comprise controlling 105 the temperature of the reference temperature sensor 51 to a third temperature value and measuring 115 a characteristic of the reference temperature sensor at the third temperature value. For example, the temperature of the reference temperature sensor 51 may be controlled to a first temperature value of 10 degrees C. (50 degrees F.), a second temperature value of 25 degrees C. (77 degrees F.), and a third temperature value of 40 degrees C. (104 degrees F.), to span an operating range of the thermometer 21.

With the temperature values and measured characteristics in hand, the method utilizes, at 125, or uses, the temperature values and the measured characteristics to solve a calibration equation. The calibration equation relates temperature and measured characteristic of the reference temperature sensor 51 for use in calibrating the reference temperature sensor. In one example, the utilizing 125 comprises utilizing the first, second, and third temperature values and the three corresponding measured characteristics to solve the following calibration equation for a, b, and c:

$$T_s = a + \frac{b}{R} + \frac{c}{R^2}$$

where $T_s$ is the temperature of the reference temperature sensor 51 in degrees Kelvin, R is the measured characteristic of the reference temperature sensor in Ohms, and a, b, and c are calibration coefficients of the reference temperature sensor calculated based upon the three temperature values and the three corresponding measured characteristics. With temperature and measured characteristic data for three equations and three unknowns (a, b, and c), the method can readily compute an exact solution for the unknowns. Thus, the equation defines a relationship between the reference temperature sensor 51 temperature and its measured characteristic (e.g., resistance). The calibration coefficients may then be uploaded to the thermometer's non-volatile memory 71 for application to the thermometer calibration equation to improve the accuracy of the temperature calculated with the calibration equation based upon the output of the reference temperature sensor 51. In another example, the method may further comprise controlling 105 the temperature of the reference temperature sensor 51 to additional temperature values (fourth, fifth, sixth, etc.) and measuring 115 a characteristic of the reference temperature sensor at the additional temperature values to further increase the accuracy of the calibration.

By analyzing a large number of reference temperature sensors 51, it was determined that the above equation most accurately describes the behavior of the reference temperature sensor in the geometry of a particular thermometer 21. Other equations developed based upon other reference temperature sensors, other thermometer configurations and geometries, or similar reference temperature sensors and similar thermometers performing differently, are also contemplated as within the scope of the present invention.

After this calibration process, the calibrated reference temperature sensor may be used, at 131, for calibrating the primary temperature sensor, as discussed in detail below.

Method of Calibrating a Thermometer

Figure 3:
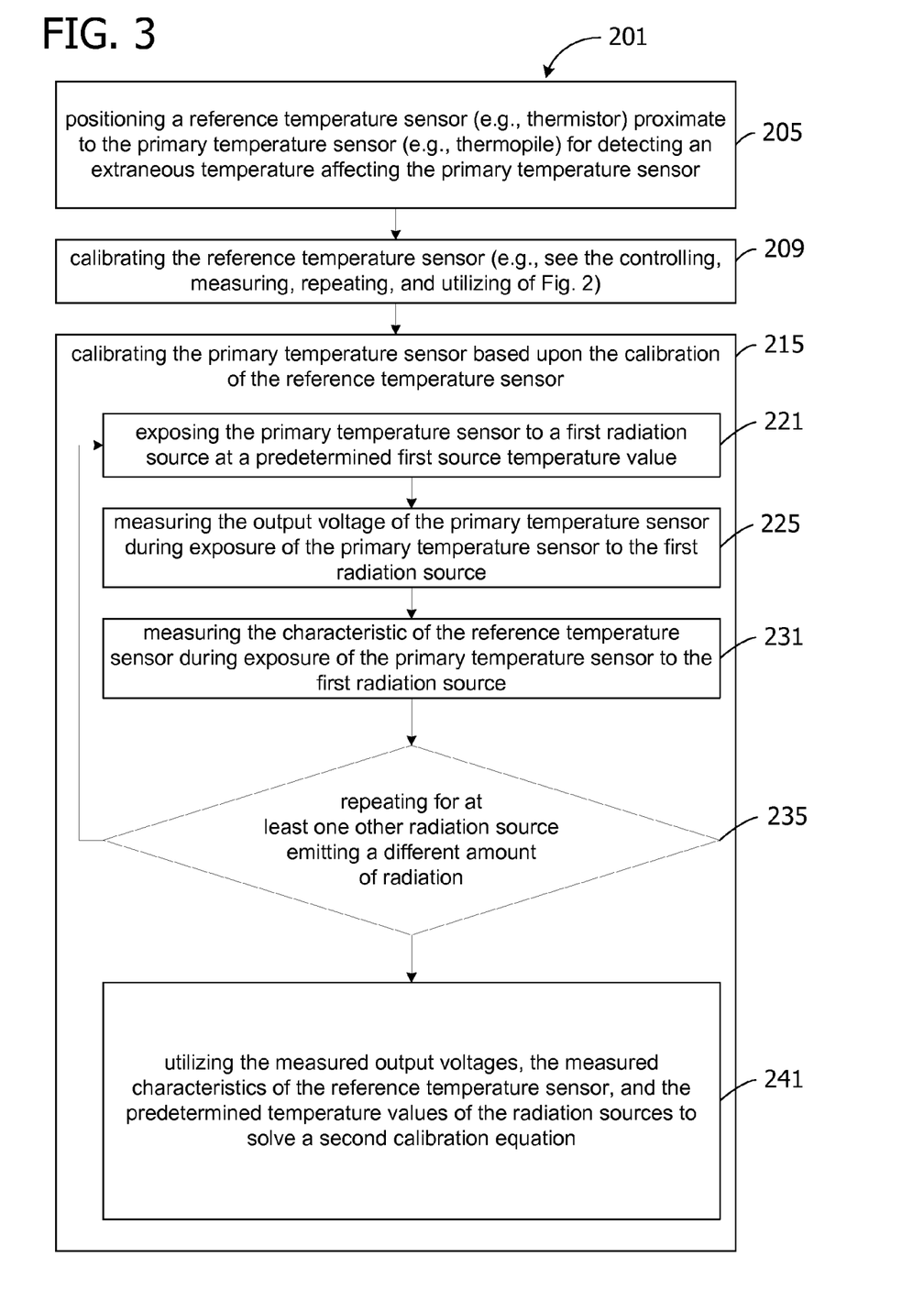
FIG. 3 is a flow diagram of a method of another embodiment of the present invention.

Referring now to FIG. 3, a method for calibrating a thermometer is depicted generally at 201. The thermometer 21 calibrated is similar to the one described above, comprising a primary temperature sensor 41 for determining a temperature. The method comprises positioning, at 205, a reference temperature sensor 51 (e.g., a temperature-dependent resistor) proximate to the primary temperature sensor 41 (e.g., thermopile) generally as discussed above. The reference temperature sensor 51 is adapted for detecting an extraneous temperature affecting the primary temperature sensor 41. In one example, the positioning operation 205 comprises embedding the reference temperature sensor 51 on the primary temperature sensor 41.

Once the reference temperature sensor 51 is positioned, the method further comprises calibrating, at 209, the reference temperature sensor. The calibration operation 209 of the reference temperature sensor 51 comprises the controlling 105, measuring 115, repeating 121, and utilizing 125 generally as set forth above.

The method further comprises calibrating, at 215, the primary temperature sensor 41 based upon the calibration 209 of the reference temperature sensor. Calibrating 215 the primary temperature sensor 41 includes several operations. In one example, calibrating 215 the primary temperature sensor 41 comprises exposing, at 221, the primary temperature sensor 41 to a first radiation source at a predetermined first source temperature value. It should be noted here that the measurements of the primary temperature sensor 41 used in the calibrating 215 are based upon a dynamic extraction algorithm (e.g., a peak detection algorithm) that is normally utilized by the thermometer 21 to determine temperature.

The calibrating operation 215 further comprises measuring, at 225, the output voltage of the primary temperature sensor 41 during exposure of the primary temperature sensor to the first radiation source. The calibrating operation 215 further comprises measuring, at 231, the characteristic of the reference temperature sensor 51 during exposure of the primary temperature sensor 41 to the first radiation source.

The exposing operation 221 and both measuring operations 225, 231 may then be repeated, at 235, for at least one other radiation source emitting a different amount of radiation at a predetermined temperature value different than the first radiation source. In one example, the repeating operation 235 comprises exposing 221 the primary temperature sensor 41 to a second radiation source at a predetermined second source temperature value. The method 201 may further comprise measuring 225 the output voltage of the primary temperature sensor 41 during exposure 221 of the primary temperature sensor to the second radiation source and measuring 231 the characteristic of the reference temperature sensor 51 during exposure of the primary temperature sensor to the second radiation source. In still another example, the method may additionally comprise exposing 221 the primary temperature sensor 41 to a third radiation source at a predetermined third source temperature value. The method may then further comprise measuring 225 the output voltage of the primary temperature sensor 41 during exposure 221 of the primary temperature sensor to the third radiation source and measuring 231 the characteristic of the reference temperature sensor 51 during exposure of the primary temperature sensor to the third radiation source. It should be understood that the first, second, and third radiation sources may be different radiation sources exhibiting different radiation levels. Alternately, a single radiation source may be adjusted to radiate different radiation levels at different times, such that the single radiation source may simulate more than one radiation source.

Any number of different measurement conditions may be utilized without departing from the scope of the claimed invention. In one example, five measurement conditions are utilized, wherein the radiation source temperatures and ambient thermometer temperatures are given as follows:

| Radiation Source Temperature | Ambient Temperature of Thermometer (calculated from measured characteristic) |
| --- | --- |
| 33 degrees C. (91 degrees F.) | 22 degrees C. (72 degrees F.) |
| 37 degrees C. (99 degrees F.) | 22 degrees C. (72 degrees F.) |
| 41 degrees C. (106 degrees F.) | 22 degrees C. (72 degrees F.) |
| 37 degrees C. (99 degrees F.) | 16 degrees C. (61 degrees F.) |
| 37 degrees C. (99 degrees F.) | 13 degrees C. (55 degrees F.) |

With the measurements and temperature values in hand, the method utilizes, at 241, the measured output voltages, the measured characteristics of the reference temperature sensor 51, and the predetermined temperature values of the radiation sources to solve a second calibration equation. The second calibration equation relates measured output voltage of the primary temperature sensor 41, measured characteristic of the reference temperature sensor 51, and the predetermined temperature values of the radiation sources for use in calibrating the primary temperature sensor. In one example, the utilizing 241 comprises utilizing the first, second, and third predetermined radiation source temperature values, the three corresponding measured output voltages, and the three corresponding measured characteristics to solve the following second calibration equation for d, e, and f:

$$V_{tp} = d + (e + fT_s)(T_s^4 - T_t^4)$$

In this equation, $V_{tp}$ is the measured output voltage of the primary temperature sensor 41. $T_s$ is a calibrated temperature value of the reference temperature sensor 51 based upon the measured characteristic of the reference temperature sensor 41. $T_t$ is the radiation source temperature value. Calculated constants d, e, and f are calibration coefficients of the primary temperature sensor 41 calculated based upon the three predetermined radiation source temperature values, the three corresponding measured output voltages of the primary temperature sensor, and the three corresponding measured characteristics of the reference temperature sensor 51. More than three measurement conditions may be utilized 241 without departing from the scope of the claimed invention. In the example noted above, for instance, five measurement conditions are utilized. In this case, standard curve-fitting techniques, or other mathematical techniques, may be utilized to extract the calibration coefficients from the measured characteristics and the exposed radiation temperatures.

The calibration coefficients are then uploaded to the thermometer's non-volatile memory 71 for application to the second calibration equation to improve the accuracy of the temperature calculated with the second calibration equation based upon the output of the reference temperature sensor 51. By calibrating both the reference temperature sensor 51 and the primary temperature sensor 41, the accuracy of the calibrated thermometer 21 may be improved and the number of data points required for calibration may be reduced.

As would be understood by one skilled in the art, the calibrating 209 of the reference temperature sensor 51 and the calibrating 215 of the primary temperature sensor 41 may occur at the same time. For example, the method 201 may control the temperature of the reference temperature sensor 51 while exposing the primary temperature sensor 41 to a first radiation source at a predetermined first source temperature value without departing from the scope of the present invention.

In still another alternate embodiment, calibrating 209 the reference temperature sensor 51 comprises controlling 105 the temperature of the reference temperature sensor to no more than three distinct temperature values. In the same embodiment, calibrating 215 the primary temperature sensor 41 comprises exposing 221 the primary temperature sensor to no more than three distinct radiation sources at three distinct, predetermined source temperature values.

Tympanic Thermometer

In another alternate embodiment, a tympanic thermometer 21 (see FIG. 1) comprises a primary temperature sensor 41, adapted to determine the temperature of a tympanic membrane based upon the radiation emitted from the tympanic membrane, generally as set forth above. The tympanic thermometer 21 further comprises a reference temperature sensor 51 being responsive to an extraneous temperature affecting the primary temperature sensor 41. The reference temperature sensor 51 may be calibrated as discussed in detail above. In one example, the primary temperature sensor 41 is a thermopile and the reference temperature sensor 51 is a temperature-dependent resistor. In still another example, the temperature-dependent resistor 51 is embedded on the thermopile 41. Although the temperature-dependent resistor 51 may be embedded on any portion of the thermopile 41, in one example the temperature-dependent resistor is embedded on the cold-junctions of the thermopile, as these portions of the thermopile are not typically exposed to the radiation source.

EXAMPLE

The following example demonstrates the application of first and second calibration equations to a Dexter ST60 polysilicon resistor. The example utilizes the following equation, with temperatures converted to degrees Kelvin:

$$T_s = a + \frac{b}{R} + \frac{c}{R^2}$$

In particular, the temperature of the reference temperature sensor may be controlled to a first temperature value of 10 degrees C. (50 degrees F.), a second temperature value of 25 degrees C. (77 degrees F.), and a third temperature value of 40 degrees C. (104 degrees F.). With these three temperatures, the three equations and three unknowns may be solved for a, b, and c as follows:

$$a = \frac{T10 \cdot R10^2 \cdot K1 - T25 \cdot R25^2 \cdot K2 + T40 \cdot R40^2 \cdot K3}{K1 \cdot K2 \cdot K3}$$

$$b = \frac{T10 \cdot R10^2 \cdot K4 + T25 \cdot R25^2 \cdot K5 + T40 \cdot R40^2 \cdot K6}{K1 \cdot K2 \cdot K3}$$

$$c = \frac{(R10 \cdot R25 \cdot R40) \cdot (T10 \cdot R10 \cdot K1 - T25 \cdot R25 \cdot K2 + T40 \cdot R40 \cdot K3)}{K1 \cdot K2 \cdot K3}$$

Letting
$K1 = R25 - R40 \quad K2 = R10 - R40 \quad K3 = R10 - R25$
$K4 = R40^2 - R25^2 \quad K5 = R10^2 - R40^2 \quad K6 = R25^2 - R10^2$ Where:
R10 is the measured characteristic of the reference temperature sensor at 10 degrees C. (50 degrees F.);
T10 is the controlled temperature of the reference temperature sensor in Kelvin (283 degrees K);
R25 is the measured characteristic of the reference temperature sensor at 25 degrees C. (77 degrees F.);
T25 is the controlled temperature of the reference temperature sensor in Kelvin (298 degrees K);
R40 is the measured characteristic of the reference temperature sensor at 40 degrees C. (104 degrees F.); and
T40 is the controlled temperature of the reference temperature sensor in Kelvin (313.15 degrees K).

After solving these equations for a, b, and c, the behavior of the reference temperature sensor is known and the temperature affecting the primary reference temperature sensor is known for any measured characteristic of the reference temperature sensor. With this relationship in hand, the following equation may be used to determine calibration coefficients for the relationship between the temperature of the radiation source exposed to the primary temperature sensor and the output of the primary temperature sensor.

$$T_t = \left[ T_s^4 - \frac{V_{tp} - d}{e + f \cdot T_s} \right]^{1/4}$$

where $V_{tp}$ is the measured output voltage of the primary temperature sensor in μVolts, $T_s$ is a calibrated temperature value of the reference temperature sensor in degrees Kelvin (based upon the measured characteristic of the reference temperature sensor), $T_t$ is the radiation source temperature value in degrees Kelvin, and calculated constants d, e, and f are calibration coefficients of the primary temperature sensor calculated based upon the three, or more, predetermined radiation source temperature values, the three, or more, corresponding measured output voltages of the primary temperature sensor, and the three, or more, corresponding measured characteristics of the reference temperature sensor. For example, several different ambient temperatures of the reference temperature sensor ($T_s$) will be utilized to determine the f coefficient, which is representative of the temperature dependencies of the thermopile. As would be readily understood by one skilled in the art, the above-noted fourth-order equation may be solved for one positive, real solution, one negative, real solution, and two complex solutions, although only the positive real solution is utilized when determining the calibration coefficients.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for calibrating a thermometer, said thermometer comprising a primary temperature sensor and a reference temperature sensor, said reference temperature sensor being positioned proximate to the primary temperature sensor and being responsive to an extraneous temperature affecting the primary temperature sensor, said method comprising:
controlling the temperature of the reference temperature sensor to a first temperature value;
measuring a characteristic of the reference temperature sensor at said first temperature value;
repeating the controlling and measuring for at least one other temperature value different than the first temperature value;
utilizing the temperature values and the measured characteristics to solve a calibration equation, said calibration equation relating temperature and measured characteristic of the reference temperature sensor wherein said repeating comprises:
controlling the temperature of the reference temperature sensor to a second temperature value;
measuring a characteristic of the reference temperature sensor at said second temperature value;
controlling the temperature of the reference temperature sensor to a third temperature value; and
measuring a characteristic of the reference temperature sensor at said third temperature value; wherein said utilizing comprises utilizing the first, second, and third temperature values and the three corresponding measured characteristics to solve the following calibration equation for a, b, and c;

$$T_s = a + \frac{b}{R} + \frac{c}{R^2}$$

where $T_s$ is the temperature of the reference temperature sensor,
R is the measured characteristic of the reference temperature sensor, and
a, b, and c are calibration coefficients of the reference temperature sensor calculated based upon the three temperature values end the three corresponding measured characteristics; and
using the calibrated reference temperature sensor to calibrate the primary temperature sensor.

2. A method as set forth in claim 1 wherein said controlling comprises controlling the temperature of a temperature-dependent resistor being responsive to an extraneous temperature affecting a thermopile.

3. A method as set forth in claim 2 wherein said measuring comprises measuring a resistance of the temperature-dependent resistor.

4. A method as set forth in claim 1 wherein said controlling the temperature comprises immersing the reference temperature sensor in a temperature-controlled bath.

5. A method as set forth in claim 4 wherein said controlling the temperature comprises immersing the thermometer in the temperature-controlled bath.

6. A method as set forth in claim 4 wherein said controlling the temperature further comprises controlling the temperature of the bath to within a range of about ±0.01 degrees C. (±0.018 degrees F.) of the desired bath temperature.

7. A method as set forth in claim 4 wherein said controlling the temperature further comprises maintaining the reference temperature sensor in the temperature-controlled bath for a period of between about 15 minutes and about 30 minutes before measuring said characteristic.

8. A method as set forth in claim 4 further comprising maintaining the reference temperature sensor in the temperature-controlled bath until the measured characteristic of the reference temperature sensor changes less than about 0.1 percent in at least about one minute.

9. A method for calibrating a thermometer, said thermometer comprising a primary temperature sensor, said method comprising:
    positioning a reference temperature sensor proximate to the primary temperature sensor for detecting an extraneous temperature affecting the primary temperature sensor; in combination with:
    calibrating the reference temperature sensor; and
        calibrating the primary temperature sensor based upon the calibration of the reference temperature sensor;
        wherein said calibrating the reference temperature sensor further comprises:
        controlling the temperature of the reference temperature sensor to a first temperature value;
        measuring a characteristic of the reference temperature sensor at said first temperature value;
        repeating the controlling and measuring for at least one other temperature value different than the first temperature value; and
    utilizing the temperature values and the measured characteristics to solve a calibration equation, said calibration equation relating temperature and measured characteristic of the reference temperature sensor for use in calibrating the reference temperature sensor, wherein said repeating comprises
    controlling the temperature of the reference temperature sensor to a second temperature;
    measuring a characteristic of the reference temperature sensor at said second temperature;
    controlling the temperature of the reference temperature sensor to a third temperature; and
measuring a characteristic of the reference temperature sensor at said third temperature;
    wherein said utilizing comprises utilizing the first, second, and third temperature values and the three corresponding measured characteristics to solve the following calibration equation for a, b, and c:

$$T_s = a + \frac{b}{R} + \frac{c}{R^2}$$

where $T_s$ is the temperature of the reference temperature sensor,
R is the measured characteristic of the reference temperature sensor, and
a, b, and c are calibration coefficients of the reference temperature sensor calculated based upon the three temperature values and the three corresponding measured characteristics.

10. A method for calibrating a thermometer, said thermometer comprising a primary tem return sensor, said method comprising:
    positioning a reference temperature sensor proximate to the primary temperature sensor for detecting an extraneous temperature affecting the primary temperature sensor; in combination with:
    calibrating the reference temperature sensor; and
    calibrating the primary temperature sensor based upon the calibration of the reference temperature sensor;
    wherein said calibrating the reference temperature sensor further comprises:
        controlling the temperature of the reference temperature sensor to a first temperature value;
        measuring a characteristic of the reference temperature sensor at said first temperature value;
        repeating the controlling and measuring for at least one other temperature value different than the first temperature value; and
    utilizing the temperature values and the measured characteristics to solve a calibration equation, said calibration equation relating temperature and measured characteristic of the reference temperature sensor for use in calibrating the reference temperature sensor;
    wherein said calibrating the primary temperature sensor comprises:
        exposing the primary temperature sensor to a first radiation source at a predetermined first source temperature value;
        measuring the output voltage of the primary temperature sensor during exposure of the primary temperature sensor to the first radiation source;
        measuring the characteristic of the reference temperature sensor during exposure of the primary temperature sensor to the first radiation source;
        repeating the exposing and both measurings for at least one other radiation source emitting a different amount of radiation at a predetermined temperature value different than the first radiation source; and
        utilizing the measured output voltages, the measured characteristics of the reference temperature sensor, and the predetermined temperature values of the radiation sources to solve a second calibration equation, said second calibration equation relating measured output voltage of the primary temperature sensor, measured characteristic of the reference temperature sensor, and the predetermined temperature values of the radiation sources for use in calibrating the primary temperature sensor.

11. A method as set forth in claim 10 wherein said repeating comprises:
    exposing the primary temperature sensor to a second radiation source at a predetermined second source temperature value;
    measuring the output voltage of the primary temperature sensor during exposure of the primary temperature sensor to the second radiation source;

measuring the characteristic of the reference temperature sensor during exposure of the primary temperature sensor to the second radiation source;

exposing the primary temperature sensor to a third radiation source at a predetermined third source temperature value;

measuring the output voltage of the primary temperature sensor during exposure of the primary temperature sensor to the third radiation source; and measuring the characteristic of the reference temperature sensor during exposure of the primary temperature sensor to the third radiation source.

12. A method as set forth in claim 11 wherein said utilizing comprises utilizing the first, second, and third predetermined radiation source temperature values, the three corresponding measured output voltages, and the three corresponding measured characteristics to solve the following second calibration equation for d, a, and f:

$$V_{tp}=d+(e+fT_s)(T_s^4-T_t^4)$$

where $V_{tp}$ is the measured output voltage of the primary temperature sensor, $T_s$ is a calibrated temperature value of the reference temperature sensor based upon the measured characteristic of the reference temperature sensor, $T_t$ is the radiation source temperature value, and d, e, and f are calibration coefficients of the primary temperature sensor calculated based upon the three predetermined radiation source temperature values, the three corresponding measured output voltages of the primary temperature sensor, and the three corresponding measured characteristics of the reference temperature sensor.

13. A method as set forth in claim 9 wherein said calibrating the reference temperature sensor and said calibrating the primary temperature sensor occur at the same time.

14. A method as set forth in claim 9 wherein said calibrating the reference temperature sensor comprises controlling the temperature of the reference temperature sensor to no more than three distinct temperature values and wherein said calibrating the primary temperature sensor comprises exposing the primary temperature sensor to no more than three distinct radiation sources at three distinct, predetermined source temperature values.

15. A method as set forth in claim 9 wherein said positioning comprises embedding the reference temperature sensor on the primary temperature sensor.

16. A method as set forth in claim 9 wherein said positioning comprises positioning a temperature-dependent resistor proximate to a thermopile for detecting an extraneous temperature affecting the thermopile.

* * * * *